(12) United States Patent
Sugimoto et al.

(10) Patent No.: US 7,918,482 B2
(45) Date of Patent: Apr. 5, 2011

(54) AIRBAG DEVICE

(75) Inventors: Shinichi Sugimoto, Tokyo (JP); Takeshi Sone, Tokyo (JP)

(73) Assignee: Takata Corporation, Tokyo (JP)

( * ) Notice: Subject to any disclaimer, the term of this patent is extended or adjusted under 35 U.S.C. 154(b) by 217 days.

(21) Appl. No.: 12/308,645

(22) PCT Filed: Sep. 12, 2007

(86) PCT No.: PCT/JP2007/067720
§ 371 (c)(1),
(2), (4) Date: Dec. 19, 2008

(87) PCT Pub. No.: WO2008/035596
PCT Pub. Date: Mar. 27, 2008

(65) Prior Publication Data
US 2010/0237596 A1    Sep. 23, 2010

(30) Foreign Application Priority Data

Sep. 21, 2006 (JP) .................. 2006-255806

(51) Int. Cl.
*B60R 21/233* (2006.01)
(52) U.S. Cl. .................. 280/729; 280/730.2; 280/743.1
(58) Field of Classification Search .................. 280/729, 280/730, 743.1
See application file for complete search history.

(56) References Cited

U.S. PATENT DOCUMENTS

| 3,930,667 | A | * | 1/1976 | Osuchowski et al. | ...... 280/730.1 |
| 4,043,572 | A | * | 8/1977 | Hattori et al. | .................. 280/738 |
| 4,290,627 | A | * | 9/1981 | Cumming et al. | ............ 280/729 |
| 6,572,137 | B2 | * | 6/2003 | Bossecker et al. | ......... 280/730.1 |
| 6,971,664 | B2 | * | 12/2005 | Amamori | ...................... 280/729 |
| 7,025,376 | B2 | * | 4/2006 | Dominissini | .................. 280/729 |
| 7,040,651 | B2 | * | 5/2006 | Bossecker et al. | ......... 280/730.1 |
| 7,090,245 | B2 | * | 8/2006 | Yoshikawa et al. | ........... 280/729 |
| 7,150,468 | B2 | * | 12/2006 | Pan | ............................. 280/730.1 |
| 7,195,276 | B2 | * | 3/2007 | Higuchi | ..................... 280/730.1 |
| 7,198,286 | B2 | * | 4/2007 | Kai | ................................ 280/729 |
| 7,347,445 | B2 | * | 3/2008 | Choi | ............................. 280/729 |
| 7,503,582 | B2 | * | 3/2009 | Sendelbach et al. | ....... 280/743.1 |
| 7,549,672 | B2 | * | 6/2009 | Sato et al. | .................. 280/730.2 |

(Continued)

FOREIGN PATENT DOCUMENTS

JP    2002-037011    2/2002

(Continued)

*Primary Examiner* — Paul N Dickson
*Assistant Examiner* — Nicole Verley
(74) *Attorney, Agent, or Firm* — Manabu Kanesaka

(57) ABSTRACT

To provide a technique that is effective for allowing a pressurized fluid to pass through smoothly between a plurality of bag-like bodies when inflated and extend, and for improving their extendibility.
An airbag device includes a first bag 35 composed of a bag body formed by joining base fabrics 35A, 35B, and provided with a supply flow passage for supplying a pressurized fluid supplied from an inflator into the inside and a flow-out passage for allowing the pressurized fluid supplied into the inside to flow out to the outside, a second bag 36 composed of a bag body formed by joining base fabrics 36A, 36B, and provided with a flow-in passage for allowing the pressurized fluid allowed to flow out from the flow-out passage of the first bag 35 to flow into the inside, and a connection panel PN for connecting the first bag 35 and the second bag 36 so that the whole of the first bag 35 and the second bag 36 is configured in a predetermined shape when inflated and extends.

9 Claims, 12 Drawing Sheets

U.S. PATENT DOCUMENTS

| | | | | |
|---|---|---|---|---|
| 2003/0178831 | A1* | 9/2003 | Roberts et al. | 280/743.1 |
| 2005/0206138 | A1* | 9/2005 | Breuninger et al. | 280/729 |
| 2007/0080522 | A1* | 4/2007 | Sugimoto et al. | 280/730.1 |

FOREIGN PATENT DOCUMENTS

| | | |
|---|---|---|
| JP | 2003-220917 | 8/2003 |
| JP | 2004-196025 | 7/2004 |

* cited by examiner (a)

(b)

AIRBAG DEVICE

TECHNICAL FIELD

The present invention relates to an airbag device equipped in a vehicle such as an automobile and the like.

BACKGROUND ART

Hitherto, there have been used various types of airbag devices, which serve to restrain the body of an occupant in an event of a vehicle collision or the like, such as a driver airbag device that is inflated and extends to the side of a driver from the rotation center of a steering wheel in a driver seat, a passenger airbag that is inflated and extends to the side of a passenger seat from an instrument panel, and the like.

In recent years, airbag devices have been proposed that are applicable to a possible case such that an occupant suffers an impact on his/her head from overhead due to a shock of an eventual big accident, which applies a large force to an automobile, such as a lateral overturn of a vehicle body caused by a collision or the like, a drop of a heavy body like a falling tree, or the like (for example, refer to Patent Document 1).

[Patent Document 1] Japanese Unexamined Patent Application Publication No. 2002-37011

DISCLOSURE OF INVENTION

Problems to be Solved by the Invention

In the prior art described above, a basic structure is disclosed that an airbag constructed of a bag-like body formed by joining base fabrics together is accommodated in a backrest portion (or a headrest) of a vehicle seat, and is inflated by being provided with a pressurized fluid from an inflator in an emergency situation to extend toward the above of an occupant's head portion.

In such a basic structure, in the case when an airbag is composed of a plurality of bag-like bodies, joint portions that allow a pressurized fluid to pass through between these bag-like bodies are required to allow the pressurized fluid to pass through smoothly between the bag-like bodies when inflated and extend.

An object of the present invention is to provide a technique that is effective for allowing a pressurized fluid to pass through smoothly between a plurality of bag-like bodies when inflated and extend, and for improving their extendibility.

Means for Solving the Problems

In order to solve the above object, the first invention of the present application is characterized in that an airbag device includes a first bag composed of a bag body formed by joining base fabrics together, and provided with a supply flow passage for supplying a pressurized fluid supplied from an inflator into the inside and a flow-out passage for allowing the pressurized fluid supplied into the inside to flow out to the outside, a second bag composed of a bag body formed by joining base fabrics together, and provided with a flow-in passage for allowing the pressurized fluid allowed to flow out from the flow-out passage of the first bag to flow into the inside, and a connection member for connecting the first bag and the second bag so that the whole of the first bag and the second bag is configured in a predetermined shape when inflated and extends.

According to the first invention of the present application, since the first bag and the second bag are connected by the connection member, the flexibility of extension movement of the first bag and the second bag is restricted by the connection member and their extension directions are guided in fixed directions when the airbag is inflated and extends. As the result, the extension ability of the entire airbag can be improved.

The second invention of the present application is characterized in that, in the first invention, the connection member connects a connection portion for the first bag connected to the one side of the first bag, and a connection portion for the second bag connected to the other side of the second bag when inflated and extends.

According to the second invention of the present application, since the connection member is connected to the one side of the first bag by the connection portion for the first bag, and is also connected to the other side of the second bag by the connection portion for the second bag when inflated and extends, the first and second bags at the time when inflated and extends are allowed to extend in a good balance without unbalanced when inflated and extends.

The third invention of the present application is characterized in that, in the second invention, the connection portion for the second bag of the connection member is provided with a plurality of pairs, which are located different positions in a vehicle width direction with each other, each of the pairs being positioned in left and right sides of the center line in the vehicle width direction.

According to the third invention of the present application, the second bag when inflated and extends can extend in a state that a vehicle width direction connected by a plurality of pairs with each other, each of the pairs being positioned in left and right sides of the center line in the vehicle width direction is restricted by the connection portion for the second bag.

The fourth invention of the present application is characterized in that, in the third invention, the connection member is composed of a fabric body.

According to the fourth invention of the present application, since the connection member is composed of a fabric body, the first bag and the second bag can extend as being guided in mutually fixed directions. In addition, when accommodated in a retainer, the connection member can also be accommodated in a state of being folded together with the first bag and the second bag.

The fifth invention of the present application is characterized in that, in the fourth invention, the connection member is composed of a non-inflatable fabric body.

According to the fifth invention of the present application, since the connection member is composed of a non-inflatable fabric body, the first bag and the second bag can be guided in fixed directions in a state that the positioning relationship therebetween is mutually restricted, when the airbag is inflated and extends.

The sixth invention of the present application is characterized in that, in any one of the first to fifth inventions, the first bag includes a pushing extension portion being inflated and extending by the pressurized fluid supplied from the inflator, the pushing extension portion being provided with a extension deriving portion for deriving the second bag to the above of the head portion of the occupant, and the second bag includes an upper extension portion, which is inflated and extends toward the above of the head portion of the occupant.

According to the sixth invention of the present application, when the pressurized fluid is supplied from the inflator, the pushing extension portion of the first bag is inflated, and at the time of inflation, the extension of the second bag is promoted to allow the upper extension portion of the second bag to be inflated and extend toward the above of the head portion of the occupant; thereby the head portion of the occupant can be restrained from moving upward.

The seventh invention of the present application is characterized in that, in the sixth invention, the pushing extension portion of the first bag is inflated and extends on the side facing the back of an occupant's head, and the second bag is provided with a lower extension portion, which is inflated and extends on the side opposite with respect to the occupant and is disposed to overlay the pushing extension portion.

According to the sixth invention of the present application, since the pushing extension portion of the first bag is inflated and extends on the side facing the back of the occupant's head, and the second bag is provided with the lower extension portion, which is inflated and extends on the side opposite with respect to the occupant and is disposed to overlay the pushing extension portion, it becomes possible to change the posture of the back of an occupant's head to lean forward effectively due to the thickness of the two portions of the pushing extension portion and the lower extension portion.

Advantages

According to the present invention, it becomes possible to provide a technique that is effective for allowing a pressurized fluid to pass through smoothly between a plurality of bag-like bodies when inflated and extends, and for improving their extendibility.

BRIEF DESCRIPTION OF DRAWINGS

FIG. 1 are schematic side views of a vehicle seat equipped with an embodiment of an airbag device of the present invention, wherein FIG. 1(a) shows a non-activated state of the airbag device and FIG. 1(b) shows an activated state of the airbag device.

Figure 1:
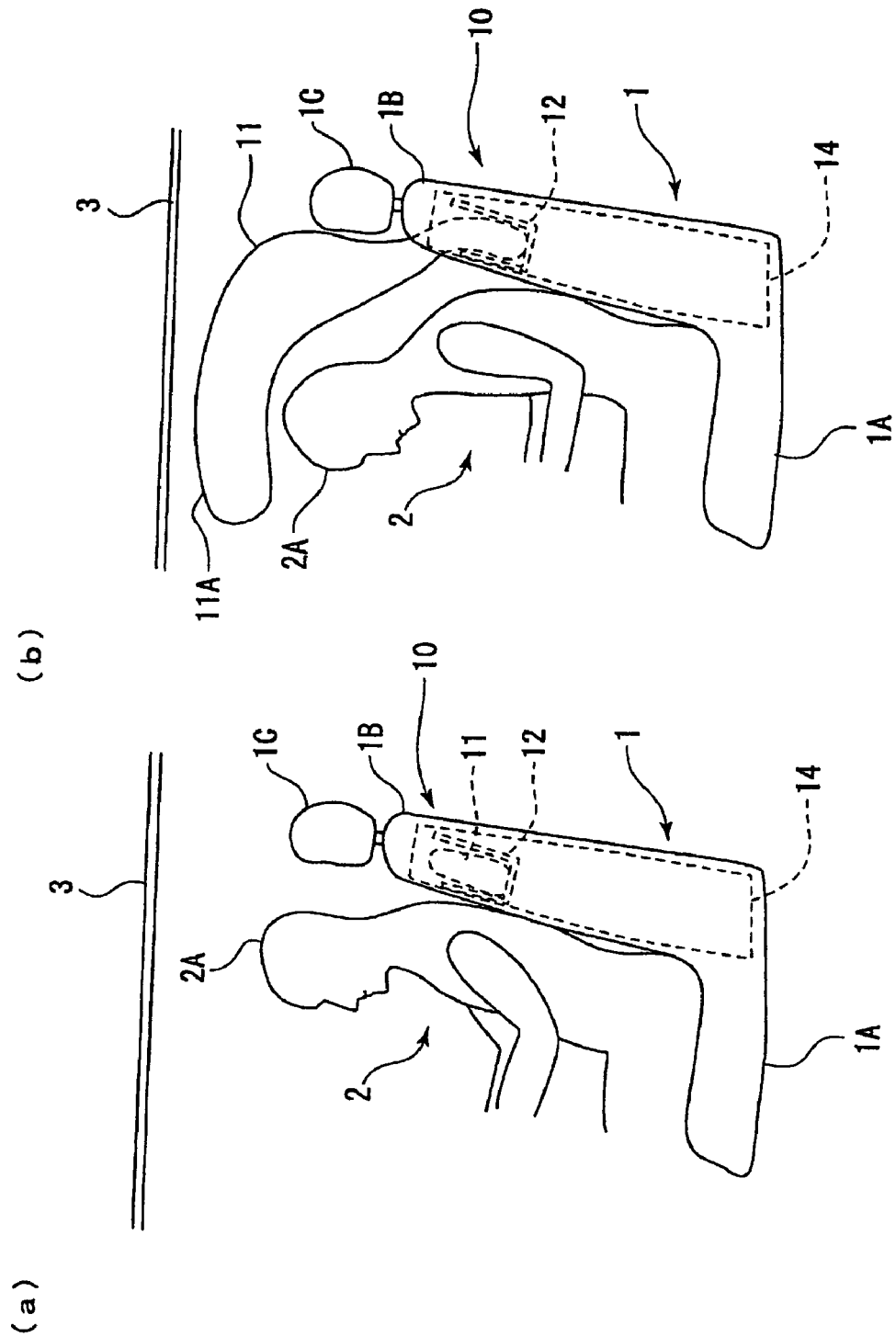

REFERENCE NUMERALS 2 occupant
2A head portion
10 airbag device
11 airbag
13 inflator
20 pipe member
35 first bag
35A first base fabric
35B second base fabric
35a gas supply port (supply flow passage)
35t flow-out passage
36 second bag
36A third base fabric
36B fourth base fabric
36i flow-in passage
37 pushing extension portion
39 upper extension portion
40 sewn joint portion (connection portion for the second bag)
40b, 40c sewn joint portions (connection portions for the first bag)
50 lower extension portion
90 extension deriving portion
PN connection panel (connection member)
SC sewn joint portion (connection portion for the second bag)
SL, SR sewn joint portion (connection portion for the first bag)

BEST MODE FOR CARRYING OUT THE INVENTION

An embodiment of the present invention will be described below with reference to the attached drawings.

FIG. 1 are schematic side views of a vehicle seat 1 equipped with an embodiment of an airbag device of the present invention, wherein FIG. 1(a) shows a non-activated state of the airbag device and FIG. 1(b) shows an activated state of the airbag device. The above seat (seat) 1 is provided with a seated portion 1A on which an occupant 2 is seated, and a backrest portion 1B projecting upward from the seated portion 1A, the backrest portion 1B being for supporting the seated occupant 2. On an apex portion of the backrest portion 1B, a headrest 1C is mounted.

The seat 1 is provided with an airbag device 10 for restraining the head portion 2A of the occupant 2 in an occasion of a lateral overturn of a vehicle body caused by an accident, or the like in the backrest portion 1B. The airbag device 10 is constituted of a first bag 35 (refer to FIGS. 5 and 6, described later) formed by joining a first base fabric 35A and a second base fabric 35B by sewing together, a second bag 36 (refer to FIGS. 5 and 7, described later) formed by joining a third base fabric 36A and a fourth base fabric 36B by sewing together, a connection panel PN described later, which becomes a connection member connecting these first bag 35 and second bag 36 with each other, and a flow-passage connecting member 60 (refer to FIGS. 4 and 12, described later) joining the first bag 35 and the second bag 36, and is provided with an airbag 11 configured so as to extend toward the above of the head portion 2A of the occupant 2 when inflated, a retainer 12 in which the airbag 11 is accommodated in a state of being folded, and an inflator 13 (refer to FIGS. 2 and 3) supplying gas (pressurized fluid) for inflating and extending the airbag 11.

The seat 1 also has a seat frame 14 in its inside, which is constructed of side plates 14 (refer to FIG. 2) and a cross member 14B (refer to FIG. 2) and the like, and forms a framework of the seat 1; the retainer 12 and the inflator 13 are attached to the seat frame 14 (details are described later).

It is noted that, although not shown, an automobile equipped with an airbag device 1 is provided with various types of sensors detecting an occurrence (or prediction of an occurrence) of a collision (including a lateral collision or the like) or lateral overturn when such an accident occurs on the automobile. And, an inflator controlling circuit (not shown) activates an initiator (not shown) of the inflator 13 according to a detection signal from the sensors.

As shown in FIG. 1(a), the airbag 11 is accommodated in the retainer 12 in a state of being folded in a normal situation. On the other hand, in an event that, for example, the automobile comes into collision or laterally overturns, or the like, the sensors described above detect it and an activating signal is input from the inflator controlling circuit to the initiator of the inflator 13; thereby the initiator is activated to inflate the airbag 11 and extend it toward between the roof 3 of the automobile and the head portion 2A of the occupant 2 as shown in FIG. 1(b) (it is noted that, in the case of an open car or the like having no roof 3, the airbag 11 extends toward the above of the head portion 2A). At this time, the airbag 11 is inflated so as to push the head portion 2A of the occupant 2 forward due to that a pushing portion (refer to FIGS. 4 and 5) of the first bag 35 and a lower portion (refer to FIGS. 4 and 6) of the second bag 36 are inflated and extend, and thereby the head portion 2A of the occupant 2 is leaned forward, which causes the load applied to the neck portion to be reduced.

Figure 2:
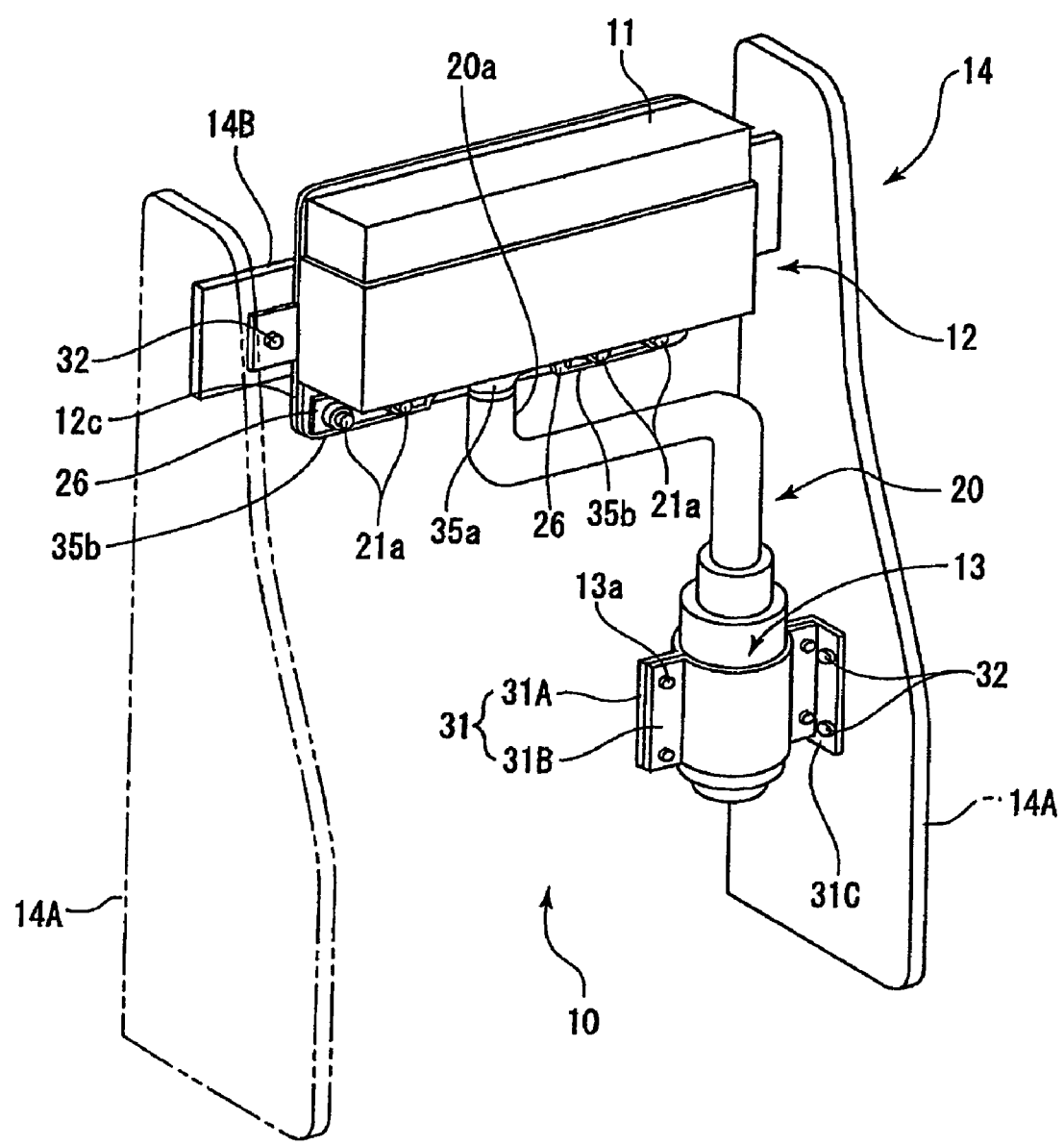
FIG. 2 is a perspective view showing a structure for fixing the embodiment of the airbag device of the present invention to a seat frame.
Figure 3:
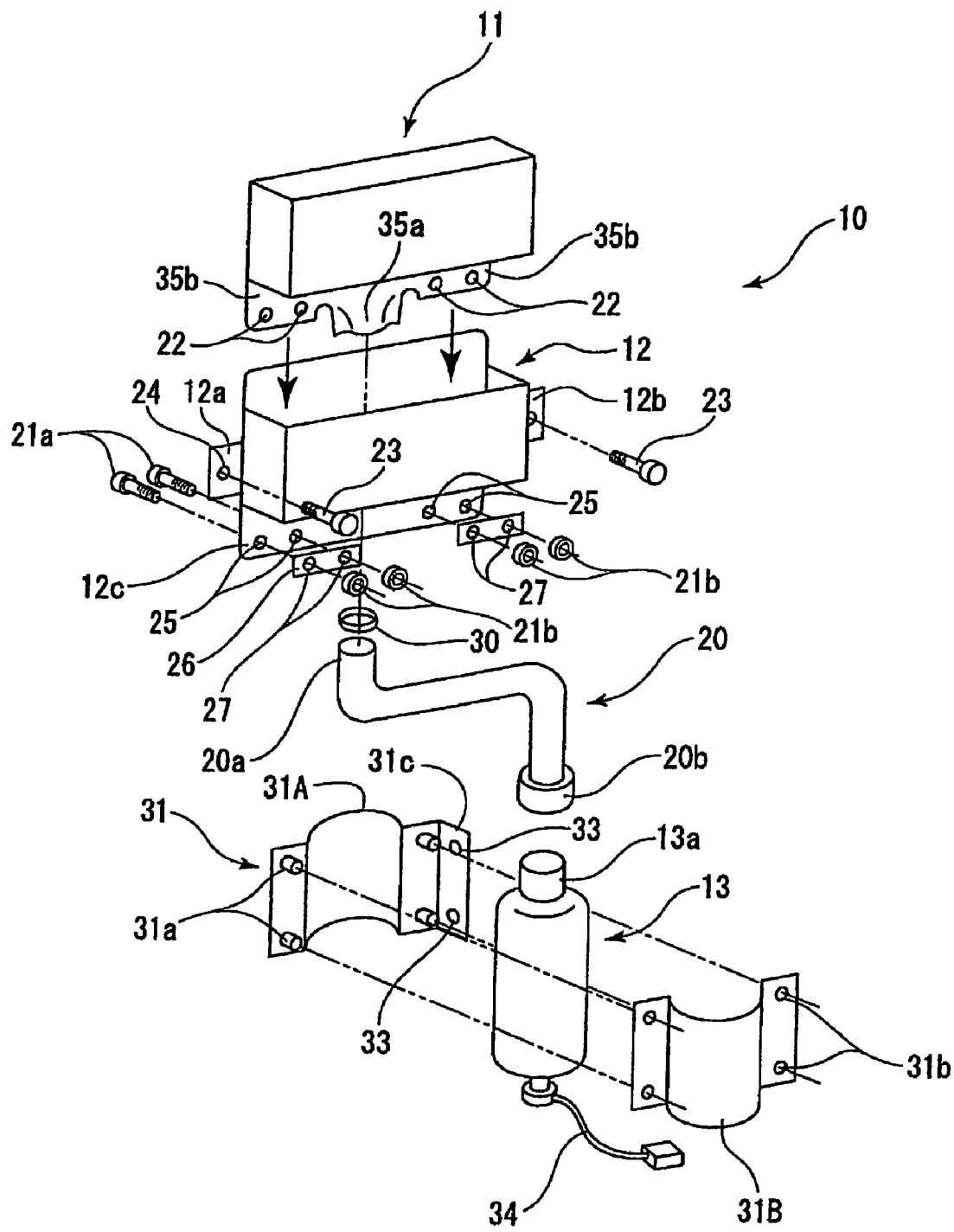
FIG. 3 is an exploded perspective view of the airbag device showing the fixing structure more in detail.

FIG. 2 is a perspective view showing a structure for fixing the airbag device 10 to the seat frame 14, and FIG. 3 is an exploded perspective view of the airbag device showing the fixing structure more in detail.

In these FIG. 2 and FIG. 3, the seat frame 14 includes a pair of side plates 14A, 14A provided on the both sides in a vehicle width direction (both sides in the left and right direction in FIG. 2) in the backrest portion 1B of the seat 1, and the cross member 14B extending along substantially a vehicle width direction between the side plates 14A, 14A and connecting the side plates 14A, 14A. The side plates 14A, 14A and the cross member 14B are all mounted in the backrest portion 1B of the seat 1. It should be understood that, although not shown, the seat frame 14 also includes a base plate provided in the seated portion 1A.

On the base end side (inflator side, lower side in FIG. 3) of the airbag 11, there are provided a gas supply port (supply flow passage) 35a (refer to FIG. 4 to FIG. 6) connected to the inflator 13 via a pipe member 20, and attachment pieces 35b, 35b (refer to FIG. 4 to FIG. 6) located on both sides of the gas supply port 35a. In each of the attachment pieces 35b, 35b, there are provided two bolt holes 22 for inserting through attachment bolts 21a (refer to FIG. 3) for fixing the airbag 11 and the retainer 12 by being punched.

On the other hand, the retainer 12 is provided with attachment portions 12a, 12b, in each of which a bolt hole 24 for inserting through an attachment bolt 23 is provided by being drilled, on its both sides in a vehicle width direction, and an attachment portion 12c, in which bolt holes 25 are also provided by being drilled in positions corresponding to the bolt holes 22 in the airbag attachment portions 35b, in its lower portion (inflator side, lower side in FIG. 3).

The plurality (4 pieces in this embodiment) of attachment bolts 21a are inserted through the bolt holes 25 formed in the retainer attachment portion 12c, the bolt holes 22 in the airbag attachment portions 35b, and bolt holes 27 formed in positions corresponding to the bolt holes 22 in the airbag attachment portions 35b in a state that the airbag 11 is folded and accommodated in the retainer 12, and are joined to nuts 21b by being screwed; thereby the airbag 11 is fixed to the retainer 12 in a state of being folded.

Likewise, the plurality (2 pieces in this embodiment) of attachment bolt 23 are inserted through the bolt holes 24 of the retainer attachment portions 12a, 12b, and then joined to joining holes (not shown) provided in the cross member 14B by being screed; thereby the retainer 12 in which the airbag 11 is accommodated in a state of being folded is fixed to the cross member 14B.

The pipe member 20 is a pipe made of, for example, a metal material, being bent at plural portions (2 portions in this embodiment), and is disposed below the retainer 12. The pipe member 20 and the airbag 11 are connected in a manner such that a bag-side end portion 20a of the pipe member 20 is covered with the gas supply port 35a of the airbag 11 and fixed by being crimped with, for example, a metal clamp band 30. Likewise, the pipe member 20 and the inflator 13 are connected in a manner such that an upper end portion 13a of the inflator 13 is covered with a connection portion 20b provided on an inflator-side end portion of the pipe member 20 and fixed by being cemented (or welded). The airbag 11 and the inflator 13 are thus connected via the pipe member 20.

The inflator 13 is provided further below the pipe member 20 and attached to the side plate 14A on one side (left side in a vehicle width direction in this embodiment) using an attachment member 31. The attachment member 31 includes a pair of attachment plates 31A, 31B, which support the inflator 13 by gripping it therebetween, and the attachment plates 31A, 31B are fixed with the inflator 13 gripped therebetween by that a plurality (4 pieces in this embodiment) of rivets 31a formed on the attachment plate 31A are inserted through a plurality (4 in this embodiment) of rivet holes 31b provided by being drilled in positions corresponding thereto in the attachment plate 31B and are connected by being riveted. In addition, the attachment plate 31A is provided with an attachment portion 31c formed by being bent at substantially 90 degrees on its one side (left side in a vehicle width direction) end portion, and a plurality (2 pieces in this embodiment) of attachment bolts (not shown) are inserted through bolt holes provided by being drilled in this attachment portion 31c and joined to joining holes (not shown) provided in the side plate 14A by being screwed; the attachment member 31 is thus fixed to the side plate 14A. As the result, the inflator 13 is fixed to the side plate 14A via the attachment member 31.

It is noted that the inflator 13 is connected with a control unit (not shown) described above by a cable 34, and ignition control of the inflator 13 is carried out via the cable 34.

Figure 4:
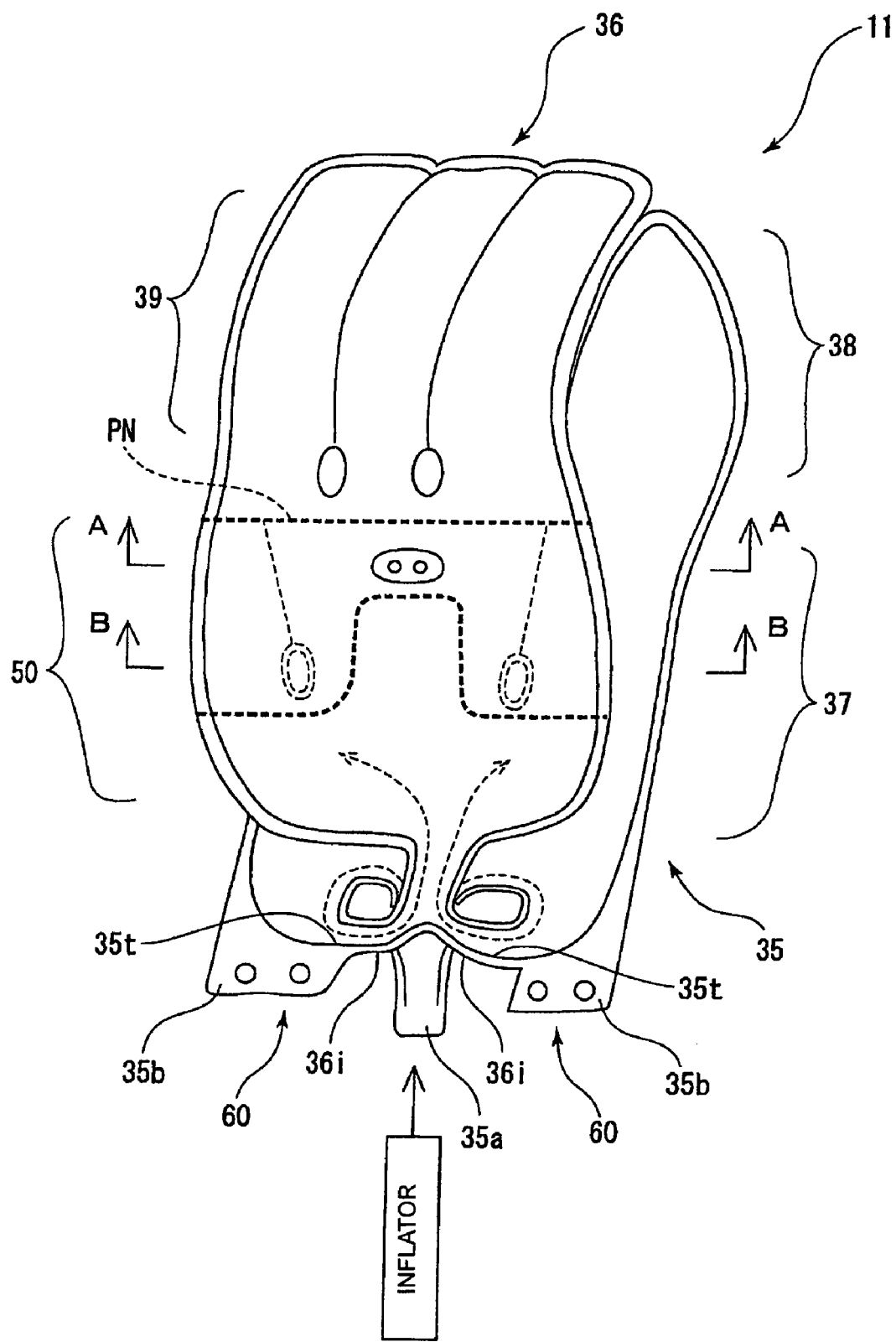
FIG. 4 is a perspective view showing a general structure of an airbag in a state of being inflated and fully extending.

FIG. 4 is a perspective view showing a general structure of the airbag 11 in a state of being fully inflated and extending.

Figure 11:
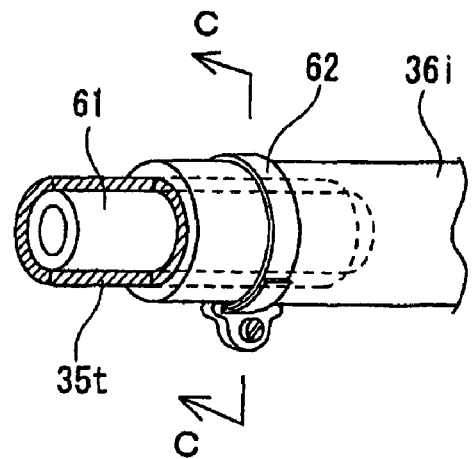
FIG. 11(a) is a perspective partially cut-away view showing one of joint portions between flow-out passages and flow-in passages in FIG. 4 by magnifying.
FIG. 11(b) is a perspective view showing the exterior of a covering portion covering the outer periphery of one of the joint portions between the flow-out passages and the flow-in passages, the covering portion having an attachment member.
Figure 11:
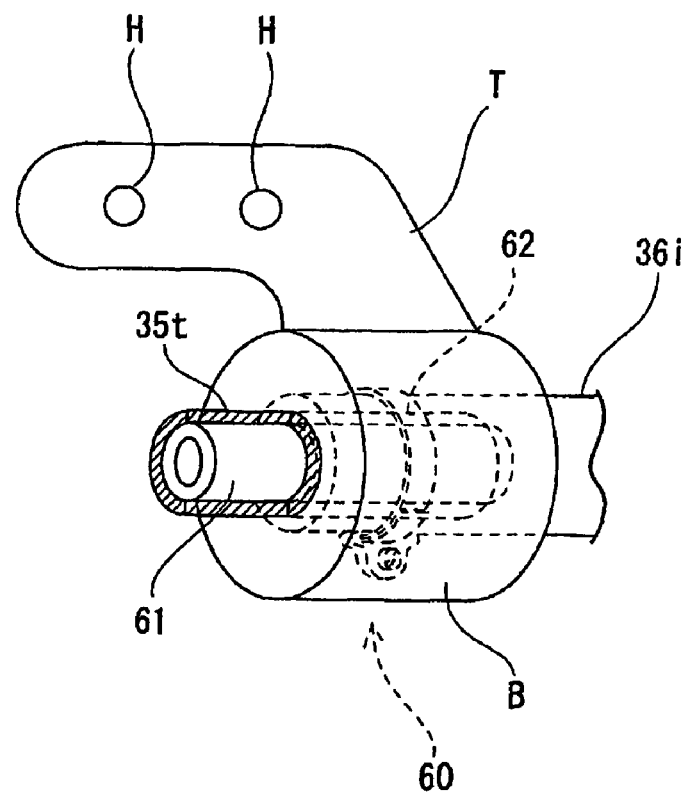

In this FIG. 4, the airbag 11 is provided with the first bag 35, which has a pushing extension portion 37 and a supporting extension portions 38 in its inside, and is inflated by being supplied with a pressurized fluid at the start from the inflator 13 and allows the pushing extension portion 37 to extend on the side facing the back of an occupant's head, the second bag 36, which has an upper extension portion 39 and a lower extension portion 50 in its inside, and is inflated by being supplied with the pressurized fluid via the first bag 35 and allows the upper extension portion 39 to extend toward the above of an occupant's head portion, while extending the lower extension portion 50 in an arrangement overlapping with the pushing extension portion 37 on the opposite side with respect to the occupant, and the flow-passage connecting member 60, which joins the first bag 35 and the second bag 36 so that the insides thereof are connected to each other. Two flow-out passages 35t each formed in the first bag 35 in a configuration of a pipe-like flow passage and two flow-in passages 36i each formed in the second bag 36 in a configuration of a pipe-like flow passage are connected to each other by being highly hermetically sealed using the flow-passage connecting member 60, respectively (refer to FIGS. 11 and 12).

In FIG. 4, the gas supply port 35a (supply flow passage) described above is provided in a lower portion of the first bag 35, and the gas blown out from the inflator 13 shown in FIG. 2 is supplied to the pushing extension portion 37 and then to the supporting extension portions 38 in the first bag 35 via the pipe member 20 and this gas supply port 35a. Then, the pressurized fluid is allowed to flow from the two flow-out passages 35t located on both sides of the gas supply port 35a in a lower portion of the first bag 35 (refer to FIGS. 5, 6 and 12) to the two flow-in passages 36i located on both sides in a lower portion of the second bag 36 (refer to FIGS. 7 and 12) and is supplied to the upper extension portion 39 and the lower extension portion 50.

As shown in FIG. 4, the first bag 35 and the second bag 36 constitutes the airbag 11 by connecting flow passages of each of independent two bag bodies 35 and 36, which are formed by sewing together base fabrics on the side of the occupant 2 (the front side of the vehicle) and base fabrics on the opposite side with respect to the occupant 2 (the rear side of the vehicle).

Figure 5:
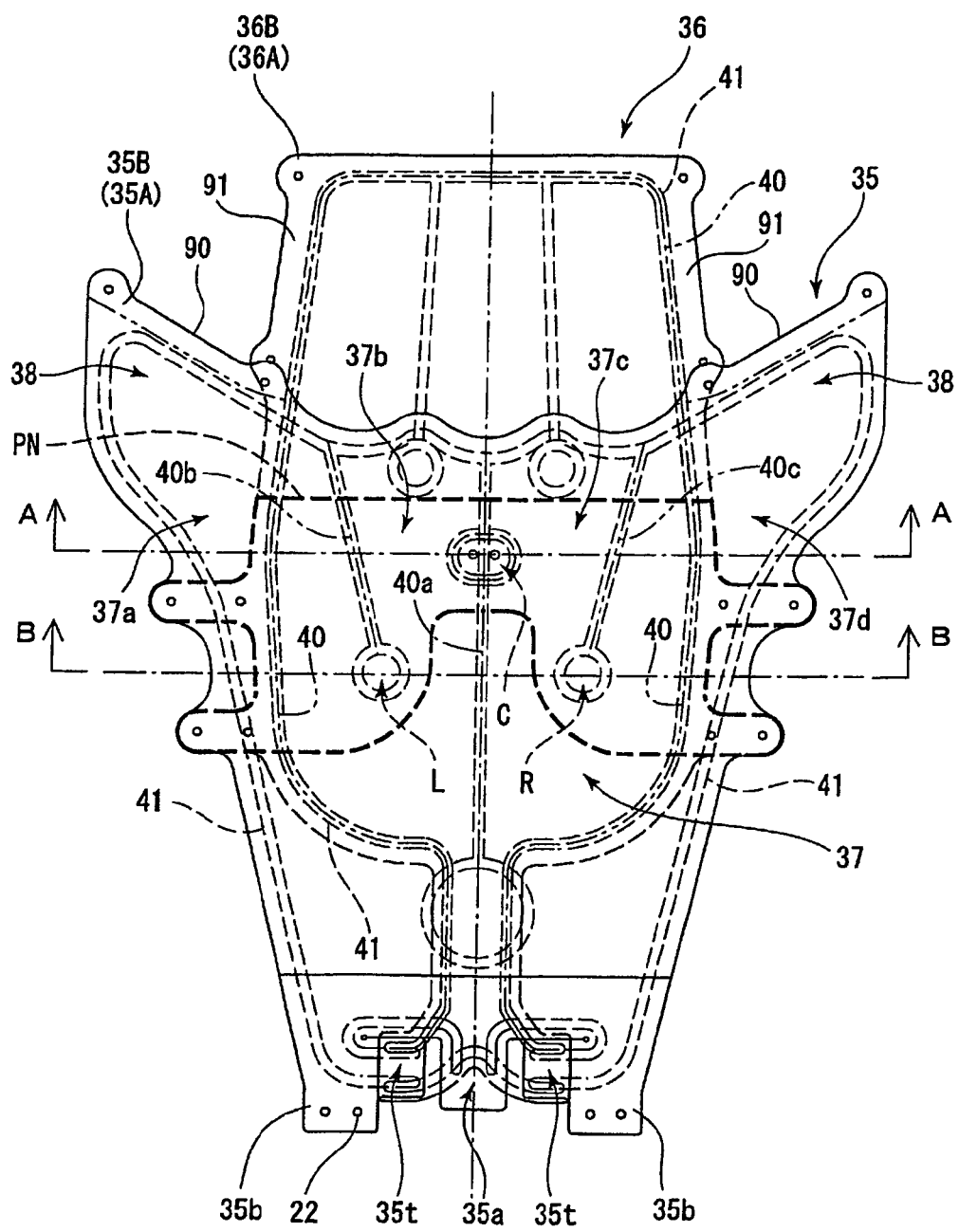
FIG. 5 is a plan view seen from the side of a second base fabric, showing a general structure of a first bag and a second bag, joined with each other by being sewn, in a state before being inflated and extending.
Figure 6:
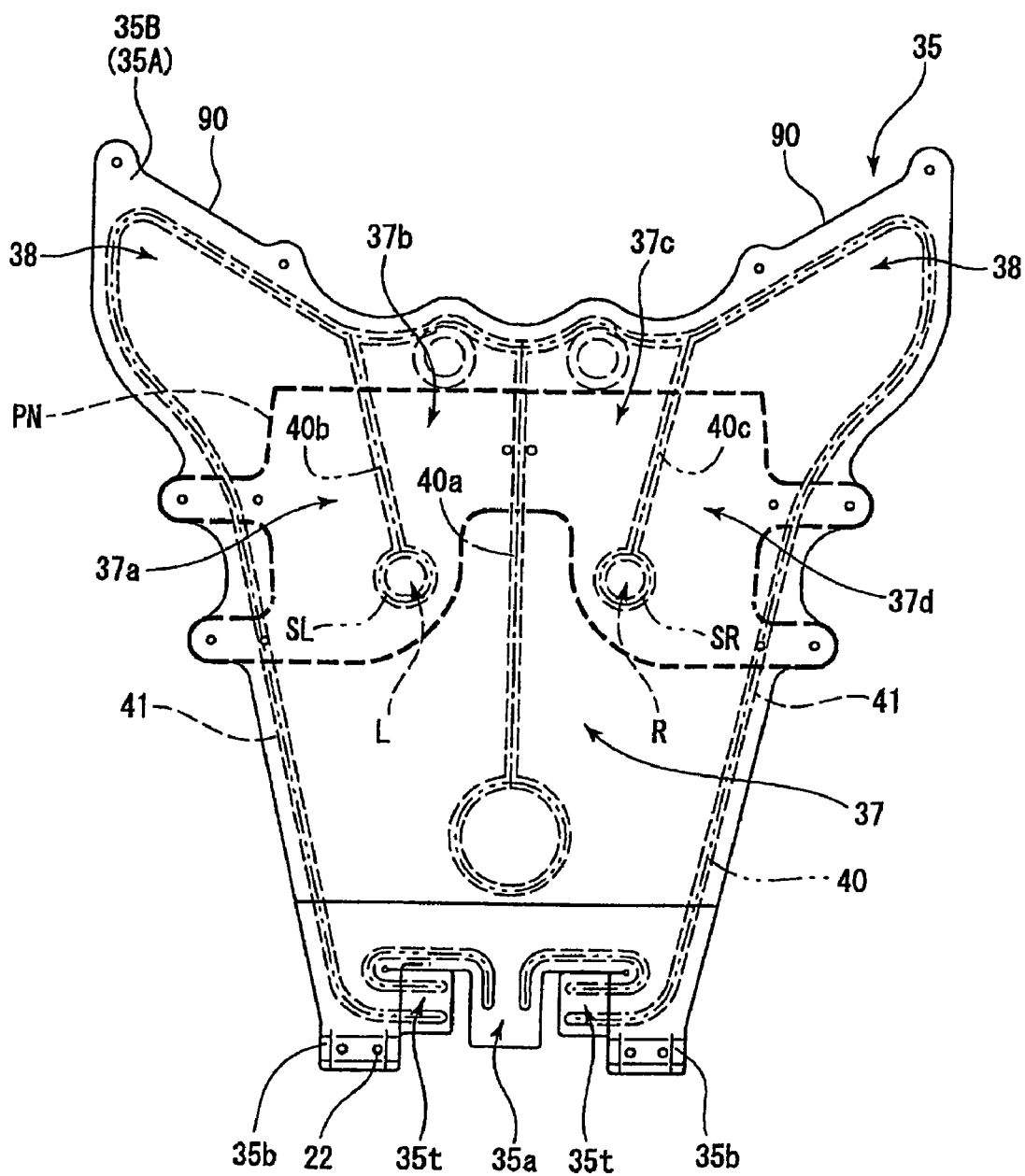
FIG. 6 is a plan view seen from the side of the second base fabric, showing a general structure of the first bag in a state before being inflated and extending.
Figure 7:
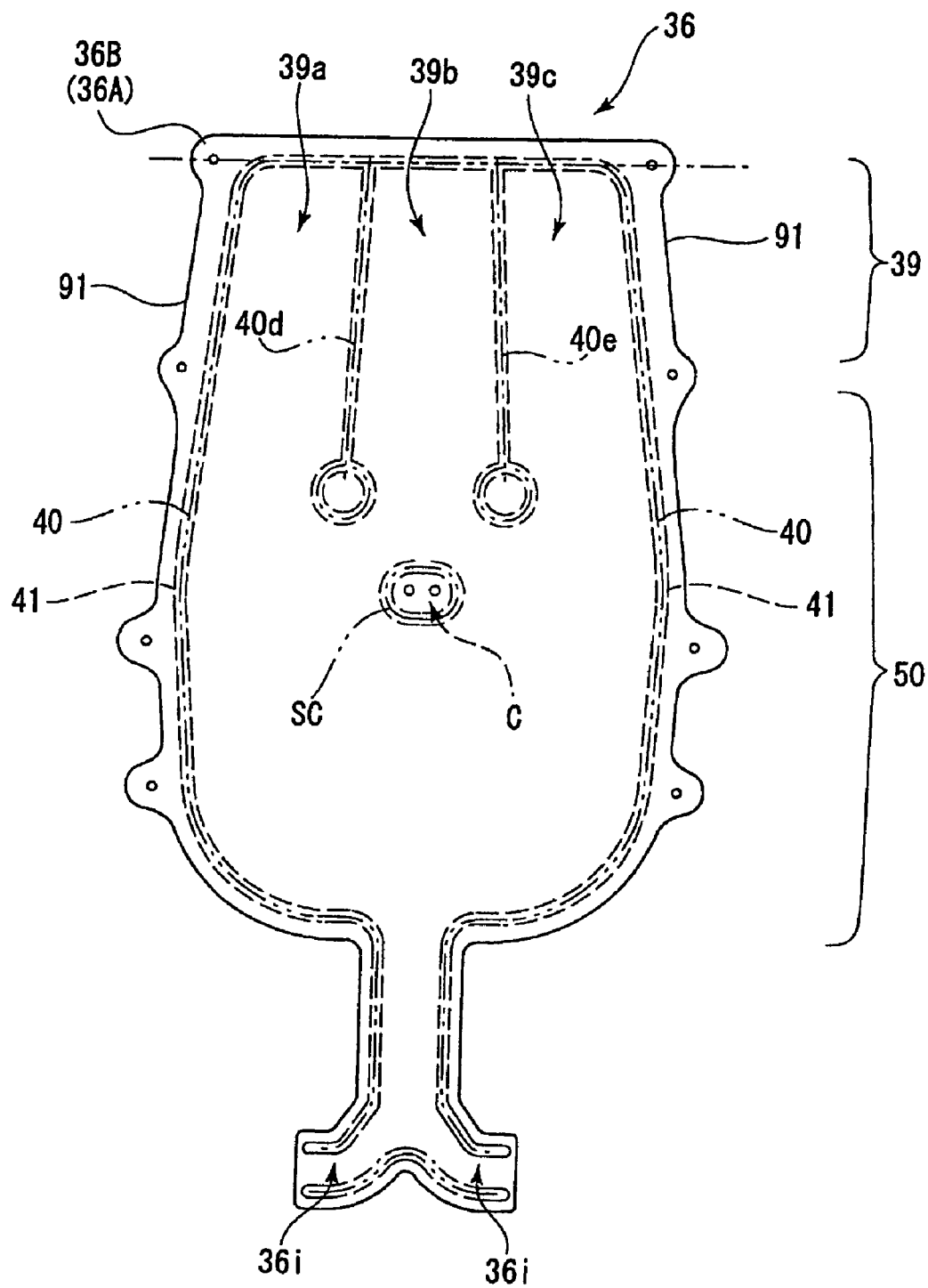
FIG. 7 is a plan view seen from the side of a fourth base fabric, showing a general structure of the second bag in a state before being inflated and extending.
Figure 8:
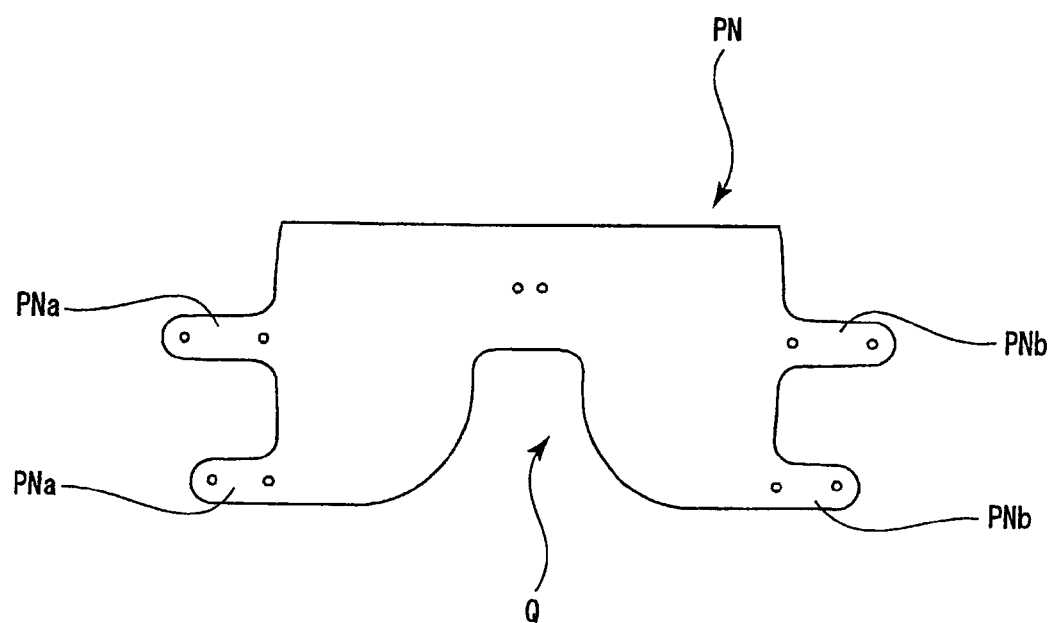
FIG. 8 is a developed view of a connection panel.
Figure 9:
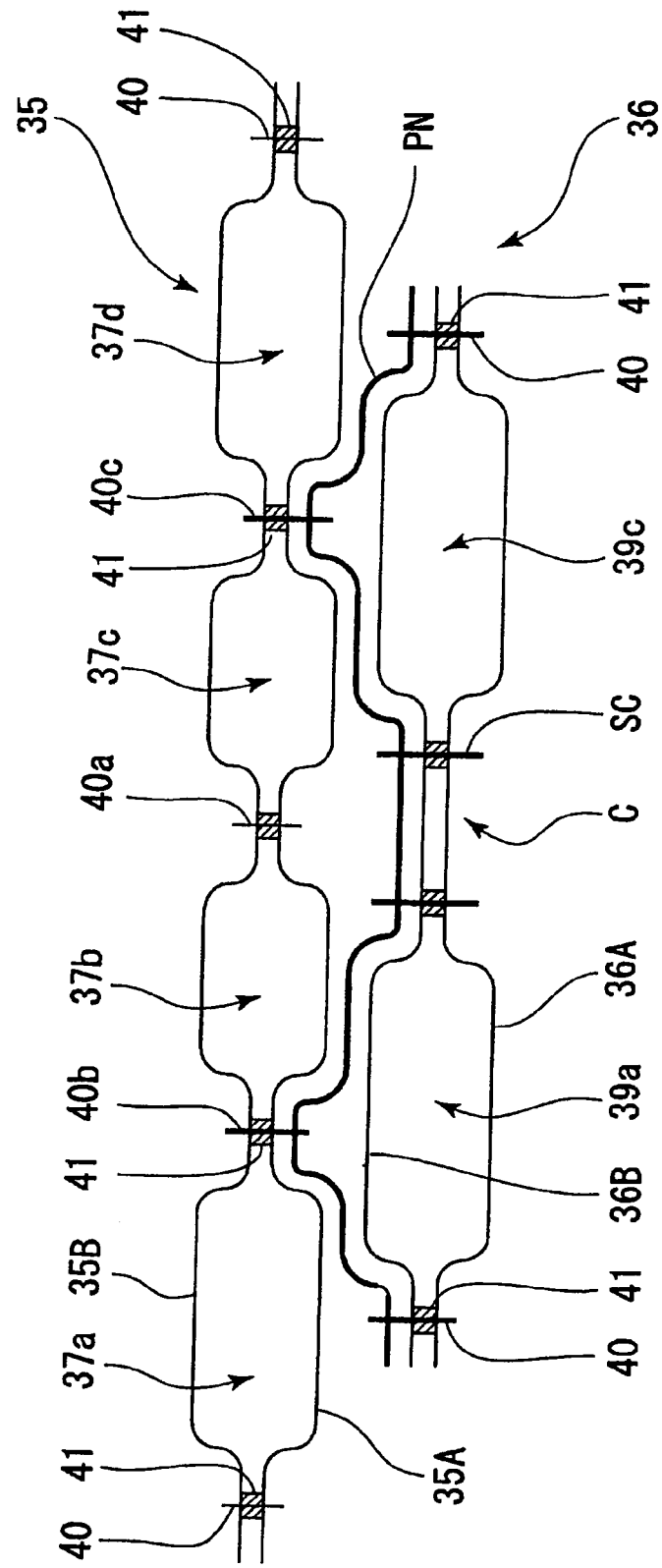
FIG. 9 is a cross-section view taken from line A-A of FIG. 5.
Figure 10:
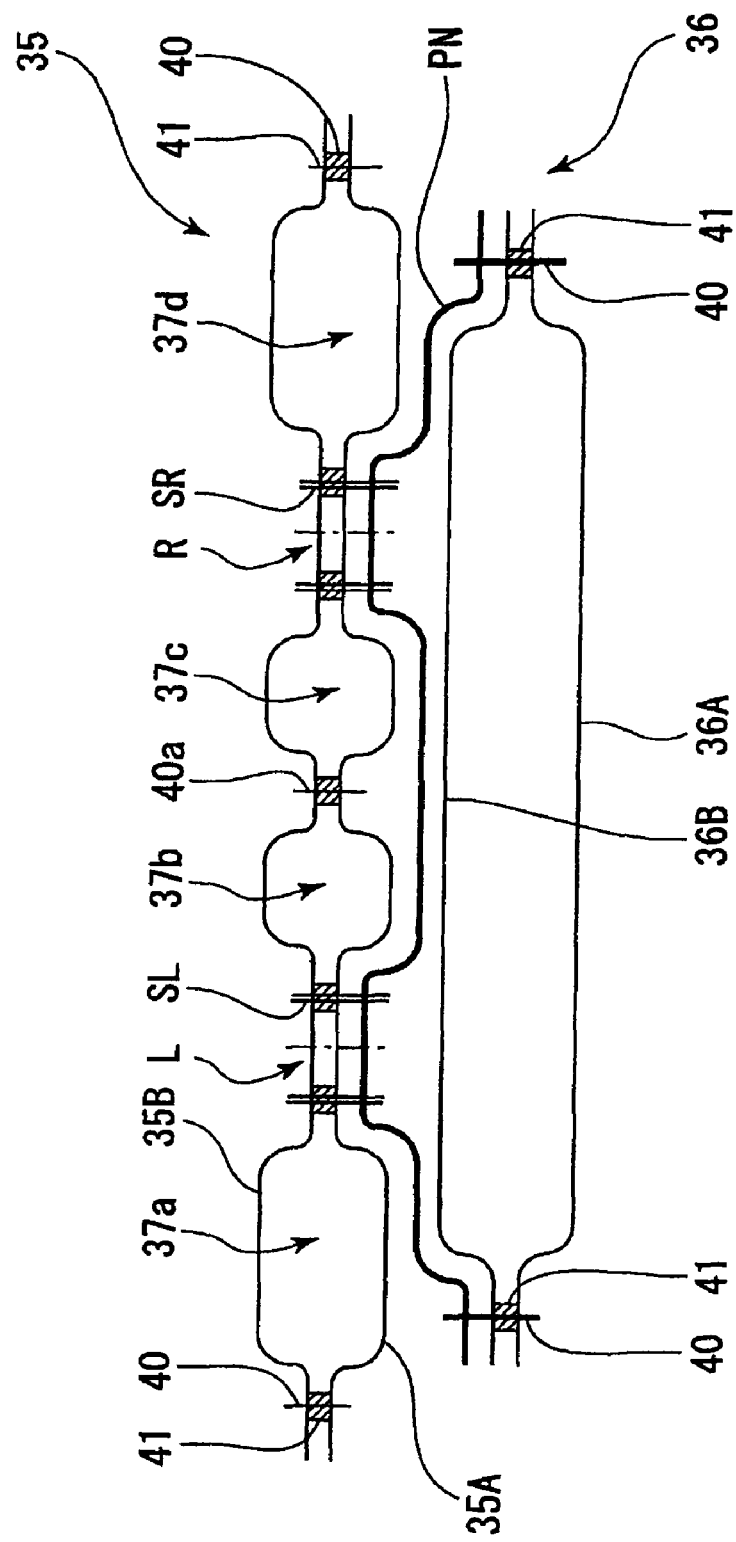
FIG. 10 is a cross-section view taken from B-B of FIG. 5.

FIG. 5 is a plan view seen from the side of the second base fabric 35B, showing a general structure of the first bag 35 and the second bag 36, joined with each other by being sewn (namely, the second bag 36, positioned on the topside of the first bag 35, seen from the side of the first bag 35), in a state before being inflated and extended (a state before being folded for being accommodated), FIG. 6 is a plan view seen from the side of the second base fabric 35B (namely, the underside of the first bag 35), showing a general structure of the first bag 35 in a state before being inflated and extending, FIG. 7 is a plan view seen from the side of the fourth base fabric 36B, showing a general structure of the second bag 36 in a state before being inflated and extending (a state before being folded for being accommodated), FIG. 8 is a developed view of a connection panel, FIG. 9 is a cross-section view taken from line A-A of FIG. 5, and FIG. 10 is a cross-section view taken from B-B of FIG. 5.

In FIGS. 5 and 6, the first bag 35 is formed as one bag body by joining the first base fabric 35A and the second base fabrics 35B, which have a substantially identical shape, by sewing the entire periphery thereof except the gas supply port 35a and the flow-out passages 35t. In the drawings, reference numeral 40 denotes the sewn joint portion, and reference numeral 41 denotes a sealing material portion constituted of an appropriate sealing material, which is provided along the sewn joint portion 40 for sealing the sewn joint portion 40.

The second base fabric 35B includes the pushing extension portion 37 having a substantially trapezoidal shape being enlarged from the side of the gas supply port 35a (lower side in FIG. 6) toward the opposite side thereof (upper side in FIG. 6) and the pair of supporting extension portions 38 provided on both left and right sides in an upper portion of the pushing extension portion 37 in the drawings. The first base fabric 35A has a substantially similar shape to the second base fabric 35B. Between the first base fabric 35A and the second base fabric 35B, there are formed the pushing extension portion 37, the pair of supporting extension portions 38 located on both left and right sides of the pushing extension portion 37, and the flow-out passages 35t by that the first base fabric 35A and the second base fabric 35B having such the shape are joined together by being sewn around the entire periphery thereof except the gas supply port 35a and the flow-out passages 35t as described above. As the result, the pushing extension portion 37, the pair of supporting extension portions 38, and the flow-out passages 35t are arranged so that their outer edges are enveloped by the sewn joint portion 40 and the sealing material portion 41 on the whole.

The pushing extension portion 37 has four pushing extension chambers 37a, 37b, 37c, 37d formed by a sewn joint portion 40a, which is provided in the substantially middle part of the pushing extension portion 37 substantially along a gas flow-in direction, and sewn joint portions 40b, 40c provided on both sides of the sewn joint portion 40a (left and right sides in FIG. 6); thereby the gas supplied from the gas supply port 35a is allowed to be smoothly introduced toward the downstream side (upper side in FIG. 6) of the pushing extension portion 37.

It is noted that, on both left and right sides of the first bag 35, there are provided extension deriving portions 90, 90 each having a substantially triangle shape.

In FIG. 6, the first bag 35 constituted as described above is formed in a manner such that the first base fabric 35A and the second base fabric 35B are first sewn in the outer peripheral area thereof along the sewn joint portion 40 in a state of being overlapped, while being sewn along the sewn joint portions 40a, 40b, 40c, and the like of the pushing extension portion 37. At this time, at the tip of each of the sewn joint portions 40b, 40c, there are formed non-inflated portions L, R, which are sewn with circular sewn joint portions SL, SR, respectively, in the periphery thereof.

Next, the supporting extension portions 38 are each bent so as to be located at a position where it sandwiches both left and right sides of the head portion of the occupant 2 with respect to the first bag 35 as shown in FIG. 4, and in order to keep the state and also to promote the extension of the second bag 36 when being inflated and extending, the extension deriving portions 90, 90 are joined with derived portions 91, 91 (refer to FIG. 7, described later) by sewing together, the derived portions 91, 91 being provided on both sides of the upper extension portion 39 of the second bag 36.

As shown in this FIG. 7, the second bag 36 is formed as one bag body by joining the third base fabric 36A and the fourth base fabrics 36B, which have a substantially identical shape, by sewing the entire periphery thereof except the two flow-in passages 36i and by provided with a sealing material 41.

The fourth base fabric 36B is a substantially rectangular-shaped member extending from the side of the flow-in passages 36i (lower side in FIG. 7) toward the opposite side (upper side in FIG. 7), and includes the upper extension portion 39 in an upper portion in the drawing and the lower extension portion 50 in a lower portion in the drawing. The third base fabric 36A also has a shape substantially similar to the fourth base fabric 36B. Between the third base fabric 36A and the fourth base fabric 36B, there are formed the upper extension portion 39 of the upper half in the drawing, the lower extension portion 50 of the lower half in the drawing, and the two flow-in passages 36i by that the third base fabric 36A and the fourth base fabric 36B having such the shape are joined together by being sewn around the entire periphery thereof except the two flow-in passages 36i as described above. As the result, the upper extension portion 39, the lower extension portion 50, and the two flow-in passages 36i are arranged so that their outer edges are enveloped by the sewn joint portion 40 and a sealing material portion 41 on the whole.

The upper extension portion 39 and an upper portion of the lower extension portion 50 has three upper/lower extension chambers 39a, 39b, 39c partitioned by two sewn joint portions 40d, 40e, which are provided substantially along a gas flow-in direction in an arrangement dividing the lower extension portion 50 into substantially three equal portions in its width direction; thereby the gas supplied from the flow-in passages 36i is allowed to be smoothly introduced toward the downstream side (upper side in FIG. 7) of the upper extension portions 39a, 39b, 39c. And, in the substantially central portion of the lower extension portion 50, there is provided a circular non-inflated portion C, which is sewn with a circular sewn joint portion SC together with a sealing material in the periphery thereof, and a pair of attachment holes are formed in its center.

The second bag 36 of the above constitution is formed in a manner such that the third base fabric 36A and the fourth base fabric 36B are first sewn in the outer peripheral area thereof along the sewn joint portion 40 in a state of being overlapped, while being sewn along the sewn joint portions 40d, 40e, the upper extension chambers 39a, 39b, 39c are next each bent forward so as to extend toward the above of the head portion of the occupant 2 with respect to the first bag 35 as shown in FIG. 4, and the derived portions 91, 91 provided on both sides of the upper extension portion 39 are joined with the extension deriving portions 90, 90 of the supporting extension portions 38 on both sides of the first bag 35 (refer to FIG. 5 to FIG. 7).

Consequently, the pushing extension portion 37 of the first bag 35 and the lower extension portion 50 of the second bag 36 are overlaid with each other at the pushing extension portion 37 and the lower extension portion 50. Moreover, in the portion where the pushing extension portion 37 and the lower extension portion 50 are overlaid with each other, the three sewn joint portions 40a, 40b, 40c of the pushing extension portion 37 and the two sewn joint portions 40d, 40e of the lower extension portion 50 are formed in an arrangement where they are shifted with each other. Because of this, the four pushing extension chambers 37a, 37b, 37c, 37d of the first bag 35 and the three upper/lower extension chambers 39a, 39b, 39c of the second bag 36 are respectively inflated and extend also in an arrangement where they are shifted with each other.

Then, the pushing extension portion 37 of the first bag 35 and the lower extension portion 50 of the second bag 36 are joined by being sewn together via the connection panel PN (refer to FIG. 8, described later), which becomes a connection member.

As shown in FIG. 8, the connection panel PN serves to guide the extension directions of the first and second bags 35, 36 in a fixed direction when the pushing extension portion 37 and the lower extension portion 50 of the first bag 35 and the second bag 36 are inflated and extend, and is constituted of a sheet of fabric (non-inflatable fabric body) so that its both side faces are formed in the same configurations as the external shapes of the first bag 35 and the second bag 36 when overlaid together. The connection panel PN is provided with four attachment pieces PNa, PNa, PNb, PNb so as to project from upper and lower portions in both sides thereof, respectively, as with the above first and second bags 35, 36, and is also provided with a recessed portion Q, which is formed in the center of a lower portion thereof. These attachment pieces PNa, PNa, PNb, PNb are attached together with corresponding attachment pieces which are formed on both sides of the first and second bags 35, 36, respectively.

The upper portion of the connection panel PN is, as shown in FIG. 9, joined with two sewn joint portions 40b, 40c located on the both sides of the three sewn joint portions 40a, 40b, 40c individually forming the four pushing extension chambers 37a, 37b and 37c, 37d of the first bag 35, and is also joined with the sewn joint portion 40, by which the second bag 36 is joined with a sealing material at its both sides, and with the circular sewn joint portion SC forming the circular non-inflated portion C, which is provided in the substantially central portion of the lower extension portion 50.

Further, the lower portion of the connection panel PN is, as shown in FIG. 10, joined with the sewn joint portions 40, 40 by which the second bag 36 is joined at its both sides, and with the circular sewn joint portions SL, SR which individually form the pushing extension chambers 37a, 37b and 37c, 37d of the first bag 35 and sew the circular non-inflated portions L, R, respectively.

That is, the connection panel PN is connected with the sewn joint portions SL, SR (connection portions for the first bag) and the sewn joint portions 40b, 40c (connection portions for the first bag) on the upper side, as one side, of the first bag 35 (the second bag side, shown on the under side in FIG. 9 and FIG. 10) when inflated and extends, while being connected with the sewn joint portion SC (connection portion for the second bag) and the sewn joint portions 40, 40 (connection portions for the second bag) on the lower side, as the other side, of the second bag 36 (the first bag side, shown on the upper side in FIG. 9 and FIG. 10).

As the connection portions for the second bag, there are provided a plurality of pairs of left and right sewn joint portions 40, which have different distances from the center line in a vehicle width direction, where the circular non-inflated portion C is provided, the plurality of pairs of sewn joint portions 40 being sewn along the peripheral portion.

In the next place, a sewing procedure for joining the connection panel PN in between the first bag 35 and the second bag 36 by sewing will be described with reference to FIG. 9 and FIG. 10.

First, as shown in FIG. 9, the lower side of the connection panel PN is joined by being sewn with the sewn joint portions SL, SR of the two non-inflated portions L, R provided in the pushing extension portion 37 of the first bag 35, and then the upper side of the connection panel PN is joined by being sewn with the sewn joint portion SC of the non-inflated portion C provided in the lower extension portion 50 of the second bag 36.

Next, after both sides of the sewn joint portion SC joined to the upper side of the connection panel PN by being sewn are joined with the sewn joint portions 40a, 40b, 40c, both sides of the connection panel PN are joined with the sewn joint portions 40, 40, which sew both sides of the second bag 36; thereby the connection panel PN is joined by being sewn in between the first bag 35 and the second bag 36.

Figure 12:
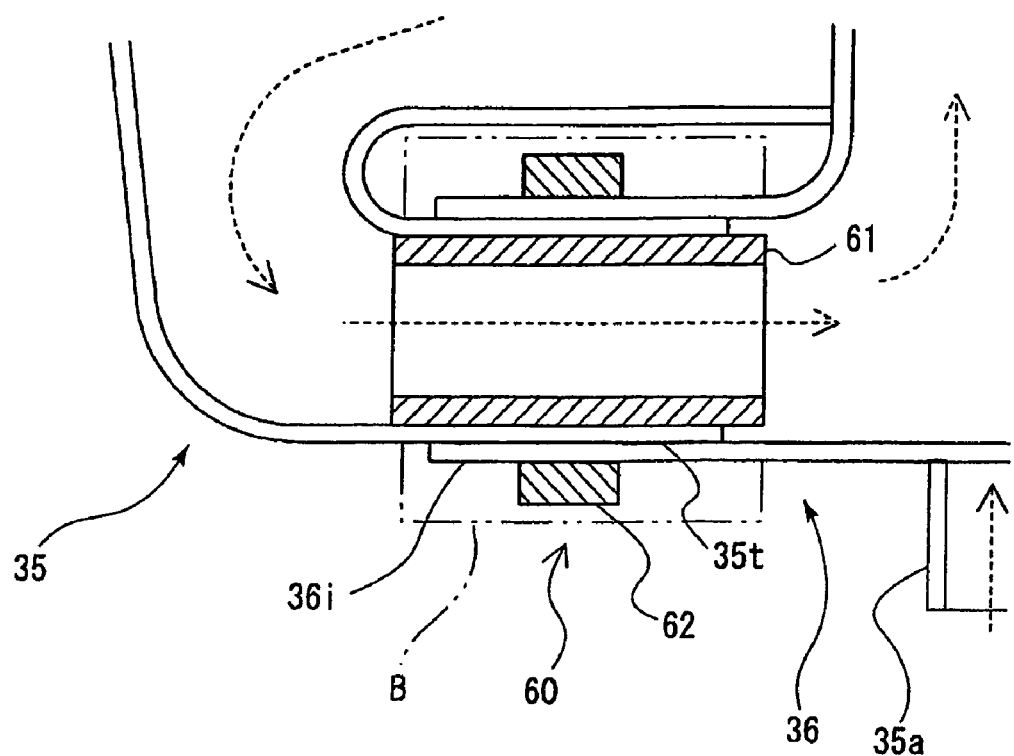
FIG. 12 is a cross-section view taken from C-C in FIG. 11(a).

FIG. 11(a) is a perspective partially cut-away view showing a joint portion between a flow-out passage 35t and a flow-in passage 36i on one side in FIG. 4 by magnifying, FIG. 11(b) is a perspective view showing the exterior of a covering portion covering the outer periphery of the joint portion between the flow-out passage 35t and the flow-in passage 36i on one side, the covering portion having an attachment member, and FIG. 12 is a cross-section view taken from C-C in FIG. 11(a).

As shown in FIG. 12, the flow-out passage 35t of the first bag 35 is inserted inside the flow-in passage 36i of the second bag 36, and the overlapped portion is joined with the flow-passage connecting member 60. This flow-passage connecting member 60 includes a hollow connection pipe 61 inserted into the overlapped portion, where the flow-out passage 35*t* and the flow-in passage 36*i* are overlapped, and an outer periphery fastening member 62 installed at the overlapped portion so as to fasten the flow-in passage 36*i* from the outside of its outer periphery.

The hollow connection pipe 61 is composed of, for example, a relatively hard plastic material, and is formed in a circular tubular (pipe-like) shape having an inner diameter adequate to allow a pressurized fluid to smoothly pass therethrough. The outer periphery fastening member 62 serves to secure the overlapped portion of the flow-out passage 35*t* and the flow-in passage 36*i* to the hollow connection pipe 61 by fastening from the outside of the outer periphery thereof with hermetically sealing; a "Ty-Rap", a clamp band, or the like, for example, is applicable for the purpose.

When the first bag 35 and the second bag 36 are thus coupled into one air bag 11 and installed into the retainer 12, they are accommodated therein in a state of being folded. At this time, since the hollow connection pipe 61 is composed of a hard material, its shape is hardly crushed, i.e., the cross-sectional shape and the state of connection of the overlapped portion of the flow-out passage 35*t* and the flow-in passage 36*i* can be maintained even when the airbag is folded.

Moreover, the outer periphery side of the overlapped portion where the flow-out passage 35*t* of the first bag 35 is inserted inside the flow-in passage 36*i* of the second bag 36, and also the outer periphery side of the outer periphery fastening member 62, which secures the overlapped portion to the outer periphery of the hollow connection pipe 61, constituting the outer periphery fastening member 62, are covered with a pipe band B, serving as a protection member. In addition, on the side of an upper portion of the pipe band B, an attachment piece T is mounted so as to project therefrom, the attachment piece T being provided with two attachment holes H corresponding to attachment threaded-holes in a lower portion of the retainer 12. The pipe band B is covered with a tubular body made of, for example, fabric, iron, plastic.

According to an airbag device 10 of this embodiment, as constituted as described above, the following advantages are obtained.

That is, in an airbag device 10 of this embodiment, a first bag 35 including a gas supply port 35*a* supplying gas supplied from an inflator 13 into the inside and a flow-out passage 35*t* allowing the gas supplied into the inside to flow out into the outside, and a second bag 36 including a flow-in passage 36*i* allowing the gas flowed out from the flow-out passage 35*t* of the first bag 35 to flow into the inside are connected by a connection panel PN so that the first bag 35 and the second bag 36 becomes a predetermined shape on the whole.

With this, when the airbag is inflated and extends, the flexibility of extension movement of the first bag 35 and the second bag 36 is restricted by the connection panel PN, and the extension direction can be guided in a fixed direction. As the result, a pressurized fluid is allowed to pass through smoothly from the first bag 35 to the second bag 36; thereby the extension ability of an entire airbag can be improved.

In addition, this embodiment is particularly configured such that the connection panel PN connects the sewn joint portions SL, SR and the sewn joint portions 40*b*, 40*c* (connection portions for the first bag) connected to the upper side, as one side, of the first bag 35 when inflated and extends, and the connection portions for the second bag connected at the sewn joint portion SC and the sewn joint portions 40, 40 connected to the lower side, as the other side, of the second bag 36.

With this, since the connection panel PN is connected to the one side of the first bag 35 by the sewn joint portions SL, SR and the sewn joint portions 40*b*, 40*c*, and is also connected to the other side of the second bag 36 by the sewn joint portion SC and the sewn joint portions 40, 40 when the airbag is inflated and extends, the first and second bags 35 and 36 at the time when inflated and extends are allowed to extend in a good balance without unbalanced when inflated and extends.

Moreover, this embodiment is particularly configured such that the sewn joint portion SC and the sewn joint portions 40, 40 of the connection panel PN are a plurality of pairs, which are located different positions in a vehicle width direction with each other, each of the pairs being positioned in left and right sides of the center line in the vehicle width direction.

With this, the second bag 36 when inflated and extends can extend in a state that a vehicle width direction connected by a plurality of pairs with each other, each of the pairs being positioned in left and right sides of the center line in the vehicle width direction is restricted by the sewn joint portion SC and the sewn joint portions 40, 40 of the connection panel PN.

Moreover, this embodiment is particularly configured such that the connection panel PN is composed of a fabric body. With this, the first bag 35 and the second bag 36 can extend as being guided in mutually fixed directions. In addition, when accommodated in the retainer 12, the connection panel PN can also be accommodated in a state of being folded together with the first bag 35 and the second bag 36.

Moreover, this embodiment is particularly configured such that the connection panel PN is composed of a non-inflatable fabric body. With this, the first bag 35 and the second bag 36 can be guided in fixed directions in a state that the positioning relationship therebetween is mutually restricted, when the airbag is inflated and extends.

Moreover, this embodiment is particularly configured such that since the first bag 35 includes the pushing extension portion 37 being inflated and extending by the pressurized fluid supplied from the inflator 13, and the second bag 36 includes the upper extension portion, which is inflated and extends toward the above of the head portion of the occupant, when the pressurized fluid is supplied from the inflator 13, the pushing extension portion 37 of the first bag 35 is inflated and also (further together with an extension promoting function of extension deriving portions 90, described later) the upper extension portion 39 of the second bag 36 is inflated and extends toward the above of the head portion of the occupant; thereby the head portion of the occupant can be restrained from moving upward.

Moreover, this embodiment is particularly configured such that the pushing extension portion 37 of the first bag 35 is inflated and extends on the side facing the back of the head of the occupant 2, and the second bag 36 is provided with the lower extension portion, which is inflated and extends on the side opposite with respect to the occupant and is disposed to overlay the pushing extension portion 37. With this, it becomes possible to change the posture of the back of an occupant's head to lean forward effectively due to the thickness of the two portions of the pushing extension portion and the lower extension portion.

It is a matter of course that each configuration of the embodiment described above does not limit the contents of the present invention, and may be practiced in various other forms not departing from the spirit and scope of the invention. For example, not a sheet of fabric but a plurality of sheets of fabric may be used for the above connection panel PN, or it may be composed of a bag body which is not inflated so much, or may further be composed of a sheet of non-inflatable fabric or a member which is formed just by sticking one upon another; thereby the first and second bags 35, 36 can be guided in fixed directions without being affected by the flexibility of extension movement.

The invention claimed is:

1. An airbag device comprising:
   a first bag composed of a bag body formed by base fabrics joined together, and having a supply flow passage for receiving pressurized fluid supplied from an inflator into an inside thereof and a flow-out passage for ejecting the pressurized fluid supplied into the inside to flow outside;
   a second bag composed of a bag body formed by base fabrics joined together, and having a flow-in passage for receiving the pressurized fluid ejected from the flow-out passage of the first bag to flow into an inside thereof; and
   a connection member for connecting the first bag and the second bag, said connection member being formed of a flat sheet separate from the first and second bags and interposed between the first and second bags so that a whole of the first bag and the second bag is configured to have a predetermined shape when inflated and extended;
   wherein the connection member has a lateral width substantially corresponding to those of the first and second bags, a length perpendicular to the lateral width, the length being less that the lateral width.

2. The airbag device according to claim 1, wherein the connection member connects a connection portion connected to one side of the first bag, and a connection portion connected to one side of the second bag when inflated and extended.

3. The airbag device according to claim 2, wherein the connection portion for the second bag is provided with a plurality of pairs, which is located at different positions in a vehicle width direction with each other, each of the pairs being positioned in left and right sides of a center line in the vehicle width direction.

4. The airbag device according to claim 3, wherein the connection member is composed of a fabric body.

5. The airbag device according to claim 4, wherein the connection member is composed of a non-inflatable fabric body.

6. The airbag device according to claim 1, wherein the first bag includes a pushing extension portion inflated and extending by the pressurized fluid supplied from the inflator, the pushing extension portion being provided with an extension deriving portion, and the second bag includes an upper extension portion, which is inflated and extends.

7. The airbag device according to claim 6, wherein the pushing extension portion of the first bag is inflated and extends, and the second bag is provided with a lower extension portion, which is inflated and extends to overlay the pushing extension portion.

8. The airbag device according to claim 1, wherein the supply flow passage is located at a lower end of the first bag, the flow-out passage comprises two exit passages arranged to sandwich the supply flow passage therebetween, and the flow-in passage is located at a lower end of the second bag and is connected to the two exit passages.

9. The airbag device according to claim 1, wherein the connection member further includes a plurality of joining portions at each lateral side thereof, and a recessed portion at a lower portion thereof.

* * * * *